United States Patent Office 3,674,517
Patented July 4, 1972

3,674,517
SOLUTION FOR DEPOSITING TRANSPARENT
METAL FILMS
Richard G. Miller, Pittsburgh, Pa., assignor to PPG
Industries, Inc., Pittsburgh, Pa.
No Drawing. Continuation-in-part of application Ser. No.
829,755, June 2, 1969. This application July 23, 1970,
Ser. No. 57,754
Int. Cl. C23c 3/02
U.S. Cl. 106—1
10 Claims

ABSTRACT OF THE DISCLOSURE

An aqueous chemical filming composition that deposits a transparent coating having a metallic luster at a rate which is relatively rapid and then relatively slower; and which effectively ceases to produce coating while the coating remains transparent is discolsed.

CROSS REFERENCES TO RELATED APPLICATIONS

This application is a continuation-in-part of my copending application Ser. No. 829,755, filed June 2, 1969. This application is also related to my copending applications, filed on even date therewith, identified as Ser. Nos. 57,575, and 57,451, and entitled, "Transparent Metal-Boron Coated Glass Articles" and "Wet Chemical Method of Producing Transparent Metal Films," respectively. This application is also related to Ser. No. 57,527, filed on even date herewith in the names of R. C. Crissman and C. B. Greenberg and entitled "Wet Chemical Method of Producing Transparent Metal Films."

BACKGROUND OF THE INVENTION

This invention relates to chemical plating, and more particularly, it relates to new aqueous chemical solutions for depositing uniformly thin transparent metal-boron films on a transparent substrate.

Of particular interest in a solution capable of providing activated glass or clear plastic plates with a metal-boron film having a metallic luster and light transmission characteristics permitting the use of such plates aes viewing closures, especially multiglazed viewing closures which normally permit vision from the inside of a building on which they are mounted and which restrain or limit heat transfer either from the sun's rays or from the interior of the building.

In the provision of such closures it is important not only to limit the degree of heat transfer therethrough but also to provide plates which have an attractive color and a relatively uniform reflectivity.

Such uniformity is especially important when such closures are installed in buildings of contemporary architecture which provide an essentially continuous glazed wall, at least in the vertical direction. When glass of the type herein contemplated is installed, considerable reflection can be observed from outside the building. Accordingly, it will be appreciated that non-uniformity in reflectivity results in a very unsightly appearance.

In the past, opaque and transparent metal containing films films have been deposited on activated glass substrates by chemically reducing metal ions on the surface of substrate being coated with an alkali metal hypophosphite reducing agent. However, such deposits inherently contain from about 3% to about 7% phosphorous which affects the color coordinates and electric conductivity, as well as certain other characteristics of the otherwise pure metal deposit, so as to render the resultant metal-phosphorous coated substrates relatively less desirable for certain commercial uses.

Metal coatings have also been produced by certain chemical plating techniques involving the use of plating baths comprising boron-containing reducing agents in place of, or in conjunction with the conventional alkali metal hypophosphites. U.S. Pat. No. 2,968,578, U.S. Pat. No. 3,140,188, U.S. Pat. No. 3,096,182 and U.S. Pat. No. 3,045,334 are representative of electroless plating processes which employ reducing agents of this type.

While the use of such prior art boron-containing plating baths has generally been effective for producing commercially acceptable opaque films of nickel-boron and cobalt-boron, for example, such baths generally cannot be utilized for producing coated substances having a luminous transmission in the range of from about 5 to about 40 percent and the uniform, mottle-free appearance necessary for use in conjunction with transparent viewing closures. In this connection, it will be appreciated that even a slightly mottled film or a localized deviation in film thickness, which is tolerable for opaque mirror deposits, is completely unacceptable for depositing on transparent viewing closures since even minor film defects are readily apparent to the dye when viewing through such closures.

Although considerable effort has been expended in the development of chemical plating baths for the deposition of metal coatings, there is no described bath which is entirely satisfactory for the formation of uniform thin films upon reactive substrates, especially transparent films that are substantially free from visible defects.

SUMMARY

In accordance with the present invention, it has been found that extremely uniform transparent metal-boron films, which are eminently suitable for use in conjunction with transparent viewing closures of all types, can be coated on a transparent substrate that is receptive to metal deposition by contacting the substrate with a specifically formulated alkaline solution of a metal compound, preferably a nickel compound, and a specifically fomulated boron-containing reducing solution, preferably comprising an alkali metal borohydride. In a preferred embodiment, the metal containing solution and the boron-containing reducing soltuion are applied to the receptive substrate separately, but substantially simultaneously. This may be done, for example, by applying the respective solutions as separate sprays which substantially simultaneously intermix and contact with the receptive substrate. In this connection, it is an essential feature of the present invention that the respective solutions intermix to form a filming composition which reduces the contemplated metal to produce a uniform coating at a rate which is relatively rapid and then relatively slower, and which effectively ceases to produce coating while the coating remains from about 5 to about 40 percent transparent, and preferably from about 15 to about 25 percent transparent; all in a matter of a very few minutes, or even seconds.

The herein contemplated filming compositions have been found to be effective over a broad temperature range for coating any of the so-called catalytic metal substrates or non-catalytic substrates sensitized in a conventional manner to promote deposition of continuous, adherent transparent metal films. However, one of the marked advantages of the present filming compositions is that they will deposit highly uniform transparent films when employed at about room temperature, i.e., from about 20 to 30° C.

DETAILED DESCRIPTION

As pointed out hereinabove, one feature of the present invention resides in providing a film forming composition that deposits a film or coating at a rate which is relatively rapid and then relatively slower and which effectively ceases to produce coating while the coating remains from about 5 to about 40 percent, and preferably from about 15 to about 25 percent transparent. Stated differently, the invention contemplates an aqueous solution of a metal compound and an aqueous solution of reducing agent for the contemplated metal which, when intermixed, provide a film forming composition that becomes substantially completely depleted of its film forming capacity within a matter of minutes, preferably within from about 20 seconds to about 3 minutes, and before any film deposited thereby becomes opaque.

One such film forming composition may be prepared by intermixing the following metal containing and reducing solutions:

METAL CONTAINING SOLUTION

In accordance with one embodiment of the present invention, the metal containing solution may comprise an aqueous solution of a metal selected from the group consisting of nickel, iron and cobalt, and mixtures thereof, usually in the form of (a) a water soluble metal salt of an inorganic or organic acid, preferably the latter, especially acetic acid, (b) a small amount of an organic or inorganic acid, preferably boric acid, (c) a complexing or chelating agent such as gluconic acid or an alkali metal salt thereof, preferably sodium gluconate, (d) a hydrazine compound such as hydrazine, hydrazine hydrate, hydroxylamine, phenylhydrazine or hydrazine tartrate, and especially hydrazine sulfate or the hydrazine salts, and (e) sufficient alkaline material, preferably ammonium hydroxide, to maintain the pH of the solution above pH 7, generally between about pH 7 to pH 11, and preferably between about pH 7.2 and pH 7.6. In a preferred embodiment, the metal containing solution also includes (f) certain non-ionic or cationic wetting agents which are known not to precipitate heavy metals from solution. Examples of such wetting agents include certain cocoamine-ethylene oxide condensates such as Ethomeen C-15 and Ethomeen C-20 of Armour and Company, described more fully below. The usual solvent for these components is water. However, water may be replaced partially or even completely with an organic solvent such as lower alcohols, i.e., ethyl alcohol.

As mentioned above, various salts of the contemplated metals and inorganic and organic acids soluble in aqueous solutions may be utilized. Metal salts having only slight solubility in aqueous solutions may be utilized inasmuch as active concetrations of the salt of the metal to be plated range from about 0.05 percent by weight to about 20 percent by weight on the solution. A preferred concentration is from about 0.5 percent by weight to about 10 percent by weight of the metal salt, e.g. the nickel salt per unit weight of solution. Furthermore, the valence state of the soluble metal ion appears to be unimportant. For example, cobaltous or cobaltic salts are generally equally effective.

Typical salts of organic acids useful in this invention includes: nickel acetate, nickel propionate, nickel citrate, nickel tartrate, cobalt acetate, cobalt citrate, iron acetate and the like, mixtures thereof and salts of solvent organic acids generally containing less than about 12 carbon atoms.

Typical inorganic metal salts useful in this invention include: nickel chloride, nickel bromide, nickel iodide, nickel sulphate, nickel fluoroborate, cobalt bromide, cobalt chloride, cobalt fluoride, iron chloride, iron bromide, iron sulphate, and the like and mixtures thereof.

The formation of transparent films of metals such as nickel, cobalt, iron and mixtures thereof has been found to be greatly facilitated by the presence of boric acid. Other acids may also be utilized, for example, acetic acid, propionic acid, citric acid, tartaric acid, and the like. Boric acid has been found to promote film uniformity and to reduce the tendency of the metal film to peel from the substrate during drying. For best results, it is desirable to include boric acid in the metal containing solution even though additional acids may be present. The quantity of boric acid employed may vary over a relatively wide range. For example, a metal containing solution comprising from about 0/0.50 percent to about 3.5 percent by weight boric acid is suitable. However, the use of a metal containing solution comprising from about 0.2 to about 1.0 percent boric acid is preferred.

A chelating agent, i.e. a compound which readily complexes metal ions in water solution, is effective in the alkaline metal containing solution to prevent precipitation of the dissolved metal compound. The preferred chelating agent is gluconic acid, or an alkali metal salt thereof, especially sodium gluconate. However, known chelating agents such as citric acid, glycolic acid, ethylene diamine, lactic acid, ethylene diamine tetracetic acid, and the like are useful. The formation of transparent metal films of good optical characteristics is enhanced by the utilization of gluconic acid or sodium gluconate, especially the latter. The quantity of chelating agent utilized should be that which is sufficient to maintain the metal compound in solution at the contemplated operating temperatures. Generally, chelating agents are utilized in a mole-to-mole ratio for each mole of metal ion present, although it has been found that lesser quantities are effective with the dilute coating solutions of this invention. Thus, while good coatings are produced from metal solutions having a molar ratio of chelating agent to metal ion as low as 1:4, a molar ratio between about 1:2 to 3:1 is preferred for deposition of transparent metal films.

It has been found that the inclusion of certain compounds containing the radical

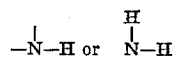

linked to an inorganic radical or another nitrogen atom as part of the metal salt solution greatly enhances the quality of the resulting deposited film produced using a borohydride as a reducing agent. Thus, substantially mottle-free, uniform, and fine-textured films are obtained when from about 0.01 percent by weight to about 1.0 percent by weight of the metal salt solution comprises hydrazine tartrate, hydrazine hydrate, hydroxylamine, phenylhydrazine, hydroxyl ammonium sulfate, and the like, and particularly hydrazine sulfate. Particularly high quality films are obtained when the metal salt solution comprises from about 0.04 to about 0.06 percent by weight of the above-described nitrogen-hydrogen type compounds, especially hydrazine sulfate. In this regard, it has been observed that the presence of such hydrazine compounds slightly retards the rate of film deposition. Accordingly, it is believed that the added hydrazine compound acts as a complexer and leveling agent that controls the rate of release of the metal ions from the complex thereof.

As pointed out briefly above, the inclusion of certain wetting agents as part of the metal salt solution has been found particularly effective for the deposition of transparent films of metals, for example, nickel, cobalt, iron, and the like. In this connection, certain non-ionic and cationic wetting agents which are known not to precipitate heavy metals from solution are generally preferred. Wetting agents particularly useful for this puropse include:

Cationic agents such as:

(1) quaternary ammonium salts, for example, tetramethyl ammonium chloride and dipropyl dimethyl ammonium chloride; and (2) alkylene oxide condensation products of organic amines wherein a typical structure is

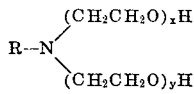

wherein R is a fatty alkyl group preferably having about 12 to 18 carbon atoms, and $x$ and $y$ represent whole numbers from 1 to about 20, typical products of this type being ethylene oxide condensation products of cocoamines, soybean amines, and the like, having an average molecular weight of about 200 to about 3,000.

Non-ionic agents such as:

(1) Alkylene oxide condensates of amides, for example, hydrogenated tallow amides having a molecular weight of about 200 to about 300, and oleyl amides wherein a typical structure is

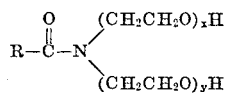

wherein R, $x$, and $y$ have the same significance as set forth immediatelly above for organic amine condensates; and (2) Alkylene oxide condensates of fatty acids.

When employed in very small amounts ranging generally from about 0.001 to about 0.1 percent by weight of metal salt solution, e.g. from about 10 to about 1000 milligrams per liter of solution, and preferably from about 25 to about 100 milligrams per liter of solution, wetting agents of the above types are generally useful in promoting film uniformity. Of particular utility are the alkylene oxide condensation products of organic amines which have been found to promote substantially mottle-free transparent films of nickel, cobalt, iron and mixtures thereof formed by the spray process described herein. Cocoamine-ethylene oxide condensates having a molecular weight of greater than about 300 have been found especially effective for this purpose. Typical of the cocoamines that may be employed is Ethomeen C–15 of Armour and Company. This cocoamine is described hereinafter in the examples.

Thus, it will be appreciated that a particularly suitable metal containing solution may comprise the formulation set forth in Table 1.

TABLE 1

Metal salt solution

| Ingredient: | Concentration, grams/l. |
| --- | --- |
| Nickelous acetate | 0.5–50 |
| Boric acid | 0.5–35 |
| Sodium gluconate | 1.0–75 |
| Hydrazine sulfate | 0.1–5.0 |
| pH (adjusted with ammonium hydroxide) 7.0–10.5. | |
| Ethomeen C–20 | 0.01–1.0 |

The metal salt solution is preferably formed by dissolving a desired quantity of a metal salt in water and adding the desired amount of chelating agent. Next, the desired amount of a nitrogen-hydrogen type compound is dissolved separately in a minimum amount of water and added to the complexed metal salt. Boric acid is preferably added next and then the pH of the solution is adjusted to about pH 7 or greater with an alkaline material, preferably a hydroxide. Boric acid may be added before the chelating and nitrogen-hydrogen type agents, but the addition of these agents preferably precedes the addition of any alkaline materials.

To achieve the activity hereindescribed and to ensure provision of a filming composition which loses its ability to provide a coating before any coating produced thereby has become opaque, the alkalinity of the metal containing solution should be maintained or buffered between a pH of 7 and 9.5, preferably between 7.2 and 7.6. Alkaline materials generally may be used for pH control although hydroxides such as sodium, potassium, and ammonium hydroxide are preferred, with best results being achieved with ammonium hydroxide. Such a solution is stable over long periods of time in the absence of the reducing agent. However, when mixed with the reducing agent it functions rapidly to produce a coating on a sensitized or catalytic surface. Concurrently, metal precipitates from solution and thus the solution becomes spent within a matter of two to three minutes, in any event less than five minutes.

As pointed out briefly above, the temperature of the metal containing solution may vary over a relatively wide range so long as it is uniform from substrate to substrate. For example, uniform, transparent films may be deposited from a metal containing solution maintained at a temperature between about 35° F. and 100° F. Practically speaking, hewover, it is preferably to maintain the temperature of the metal containing solution between about 50° F. and about 90° F., and most preferable to maintain the temperature between about 60° F. and 85° F.

REDUCING SOLUTION

The reducing solution comprises an aqueous solution of a boron-containing reducing agent and has a pH greater than 7, preferably greater than about 9, inasmuch as boron-containing reducing agents oxidize very rapidly in acid and neutral solutions. Such solutions are comparatively stable. To achieve the rapid activity desired after the reducing solution is added to the metal solution, it is preferred that the pH of the intermixed solution, that is, the filming composition formed by intermixing the metal and reducing solutions at the surface of the substrate being coated, be at least 7, but below 9.5, and preferably between about 7 and 8.5. Best quality transparent films are formed when the reducing solution is maintained at a pH of about 11 to 12.5; the most preferred range of pH being from about 11.2 to about 11.7. Thus, the pH of the intermixed solution may be readily controlled by control of the respective reducing and metal solutions.

The boron-containing reducing agent may be present in the reducing solution in an amount equal to from about 0.01 to about 5.0 percent by weight based upon the weight of the reducing solution. While boron-containing reducing agents are effective in the aforementioned range, a preferred concentration of about 0.03 to about 1.0 percent by weight of reducing agent based upon the weight of the reducing solution is preferred. The balance of the solution usually is water although organic solvents such as the lower alcohols may be used if desired.

Exceptionally useful boron-containing reducing agents are the alkali metal borohydrides such as sodium borohydride, and potassium borohydride.

It has been found that films having superior uniformity and texture are obtained when the reducing solution includes a small amount of a wetting agent of the type described above to facilitate proper intermixing with the metal containing solution. In this connection, it has been found that from about 0.001 to about 0.1 percent by weight, e.g. from about 10 to about 1000 milligrams of wetting agent per liter of solution and preferably from about 10 to about 50 milligrams of wetting agent per liter of solution is generally sufficient for this purpose.

Thus, it will be appreciated that a carticularly suitable boron-containing reducing solution may comprise the formulation set forth in Table 2.

TABLE 2

Reducing solution

Ingredient: Concentration, grams/l.
- Sodium borohydride _____ 0.1–25
- pH (adjusted with sodium hydroxide) 10–12.5.
- Ethomeen C–20 _____ 0.01–1.0

Process

While the herein contemplated filming compositions are equally employable in batchwise and continuous deposition techniques, they are particularly advantageous when utilized in continuous spray deposition techniques. Generally speaking, when employed in such continuous spray techniques, the metal containing solution and reducing solution are each passed through separate spray guns so that the sprays intermix and uniformly contact the surface of substrates to be coated, the substrates advancing relative to the spray guns. The separate sprays are preferably applied simultaneously to facilitate proper intermixing. After being uniformly distributed on the surface of the substrate being coated, the intermixed film forming composition is permitted to rest relatively quietly. This quiescent period or period of minimum turbulence is highly desirable since it enables the film forming composition to deposit a transparent coating which is substantially free from visual defects normally attributed to turbulence or agitation of the filming composition during deposition. In addition, it is during this quiescent period that the intermixed filming compositions contemplated herein undergo a change in their capacity for depositing a film such that the rate of film deposition, which is initially relatively rapid, decreases and then effectively completely ceases while the deposited film is still transparent. While the time required for this change in filming capacity to occur will vary considerably depending upon the chemistry of the actual filming composition employed, a filming composition comprising equal amounts of the nickel acetate solution and borohydride reducing solution illustrated respectively in Tables 1 and 2 above will normally undergo a substantial decrease in its filming capacity within from about 10 seconds to a few minutes after the respective solutions are intermixed, and will thereafter effectively cease to deposit additional film within from about 10 seconds to a few minutes. In this regard, an activated glass plate that is coated with a metal and boron containing film by a relatively short, e.g., 15 seconds, single spray application of the above illustrated intermixed filming composition will normally have a luminous transmission of from about 25 to about 40 percent when the filming capacity of the composition has depleted and filming has effectively ceased.

After remaining on the substrates for a period of time sufficient to substantially deplete the intermixed composition of its filming capacity, the spent or dead solution is washed off.

Since an intermixed solution prepared in accordance with the present invention will always become depleted of its filming capacity before any film deposited thereby becomes opaque, the substrates being coated are generally sprayed several times with fresh solution. Thus, depending upon the various deposition parameters such as the concentration and pH of the intermixed filming composition, the spraying sequence may be repeated for each substrate as many times as necessary to prepare a final film thickness having the desired degree of transparency.

In practice, each of the metal and reducing solutions is sprayed separately, but preferably simultaneously, onto the precleaned and activated surfaces to be coated at a flow rate varying from about 10 to about 1500 milliliters per minute per square foot of activated surface. Of course, the actual flow rate that is employed depends upon the concentration of the intermixed filming solution, the temperature and pH thereof, the transparency of the desired coating, the respective positions of the spray guns employed, the rate of advancement of the activated surfaces relative to the spray guns, and the like. Generally speaking, however, it is desirable to maintain the flow rates of the respective solutions such that the molar ratio of the boron-containing reducing agent and the metal being reduced varies from bout 1:3 to about 3:1.

As discussed more fully in applicant's copending application, Ser. No. 57,451, entitled "Wet Chemical Method of Producing Transparent Metal Films," it has been found generally preferable to employ multiple gun sets when coating with the herein contemplated solutions on a commercial scale. In this connection, each gun set would comprise a spray gun for the metal containing solution and a spray gun for the reducing solution, each operated at a flow rate varying from about 300 to about 2000 milliliters of solution per minute per gun.

The herein contemplated solution can be employed at temperatures in the range of from about 35° F. to about 100° F. for coating only those substrates which are receptive to metal deposition. For the deposition of films of nickel, cobalt, iron, and mixtures thereof, it is preferred to have a reactive metal substrate. Thus, in the formation of a transparent article, an appropriate substrate is a transparent glass plate coated or at least activated with a transparent metal film or deposit of copper, aluminum, tungsten, cobalt, platinum, silver, boron, thallium, vanadium, titanium, nickel, gold, germanium, silicon, chromium, molybdenum, iron, tin, palladium, lead, indium, cadmium, zinc, and the like. For example, a transparent copper film could be deposited on a transparent glass or plastic substrate by means of vacuum deposition or sputtering, whereafter the copper coated substrate could be sprayed according to the teaching of this invention with a transparent coating of nickel, cobalt, iron, or a mixture thereof.

A further method of activating the substrate for chemical deposition with the solutions of the present invention may be accomplished in accordance with the teachings of U.S. Pat. 2,702,253 or U.S. Pat. 3,011,920, the teachings therein being incorporated herein by reference. Thus, the present filming compositions are applicable in forming transparent metal-boron films on activated clear plastic and glasses, especially soda-lime-silica glasses, as well as on a wide variety of activated glass, ceramic, glass-ceramic, siliceous and calcereous base compositions. For example, the present compositions can be used to provide metal-boron and particularly nickel-boron films on the following types of glasses; soda-lime-silica glasses; alkali-alumina-silica glasses, such as those containing lithia as a component alkali; alkali-zirconia-silica glasses; alkali-alumina-zirconia-silica glasses; borosilicate glasses, etc. Bearing this in mind, the present invention is described hereinbelow with specific reference to soda-lime-silica glass.

The soda-lime-silica glass to be treated can be a clear glass or it can be a colored glass tinted by the introduction of various conventional materials into the glass forming batch. These latter glasses are often referred to as heat absorbing glasses especially when they contain iron oxide. Representative soda-lime-silica glass bases which can be treated in accordance with this invention usually contain 65 to 75 percent by weight $SiO_2$, 10 to 18 percent by weight $Na_2O$, 5 to 15 percent by weight $Na_2SO_4$, 0 to 5 percent by weight alumina oxide ($Al_2O_3$), 0 to 8 percent by weight $K_2O$, 0 to 8 percent by weight $B_2O_3$, 0 to 1 percent by weight iron oxide ($Fe_2O_3$), and 0 to 0.7 percent by weight of NaCl, $SO_3$, $As_2O_5$, BaO, NiO, CoO and Se and combinations thereof.

A representative range of composition for soda-lime silica glasses is listed as follows (wherein the given amounts of metals listed are determined as their oxides, except as otherwise noted):

| Component: | Percent by weight |
|---|---|
| $SiO_2$ | 68–73.5 |
| $Na_2O$ | 12–17 |
| $CaO$ | 7–12 |
| $MgO$ | 2–4 |
| $Na_2SO_4$ | 0–0.8 |
| $NaCl$ | 0–0.3 |
| $Fe_2O_3$ | 0.05–0.09 |
| $Al_2O_3$ | 0–3.5 |
| $B_2O_3$ | 0–6 |
| $K_2O$ | 0–1.5 |
| $As_2O_5$ | 0–0.5 |
| $BaO$ | 0–0.7 |
| $NiO$ | 0–0.1 |
| $CoO$ | 0–0.1 |
| $SO_3$ | 0–0.5 |
| $Se$ | 0–0.1 |

This invention will be further understood from the specific examples which follow. It should be noted, however, that the present invention is not necessarily limited to the specific materials, temperatures, contact times, and pH values noted in the below examples.

EXAMPLE 1

A 12 inch by 12 inch by one-quarter inch commercial soda-lime-silica clear glass plate was washed with a commercial detergent until the glass was completely and uniformly wetted by water. The plate was rinsed with tap water and then rinsed with demineralized water.

The glass surface was then contacted with a dilute solution of stannous chloride (about 0.1 percent by weight $SnCl_2$). The glass was thoroughly rinsed with demineralized water and then contacted with a dilute solution of palladium chloride (about 0.025 percent by weight $PdCl_2$). The glass was completely rinsed with demineralized water.

The glass was hand sprayed with two sprays—one of nickel solution, the other of a borohydride reducing solution—to form a nickel-boron film. The sprays intermingled at the glass surface. Each spray had a flow rate which ranged from about 50 to 500 milliliters per minute; however, the rates were maintained in a balanced condition. The nickel solution was formulated as follows:

Nickel solution composition

| | |
|---|---|
| Nickelous acetate | 5 grams. |
| Boric acid | 2.5 grams. |
| Hydrazine sulfate | 0.5 grams. |
| Gluconic acid (50 percent solution in water) | 13 milliliters. |
| Ammonium hydroxide | Added until pH 7.5. |
| Ethomeen C–15 [1] | 2 drops (0.06 gram). |
| Water | Added to form 1 liter solution. |

[1] Ethomeen C–15 (trademark of Armour and Company) is a cocoamine having an average molecular weight of 422 and the following generalized formula:

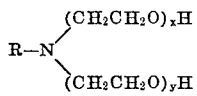

wherein R is derived rom a cocoamine and $x+y$ equals 5. The nickelous acetate was dissolved in water, the chelating agent (gluconic acid), hydrazine sulfate and boric acid were then added in that order followed by ammonium hydroxide and C–15. Additional water was added to bring solution volume to 1 liter. The reducing solution was formulated as follows:

Reducing solution composition

| | |
|---|---|
| Sodium borohydride | 0.75 gram. |
| C–15 | 1 drop (0.03 gram). |
| Sodium hydroxide | Added to pH 11.6. |
| Water | Added to form 1 liter solution. |

The temperature of each solution was about room temperature.

The above solutions were sprayed substantially simultaneously in equal volumes upon the activated glass plate. Film formation was rapid. After spraying for about 20 seconds, the spraying was stopped and the sheet permitted to rest quietly for 40 seconds during which time film deposition effectively ceased. The resulting nickel film was mottle free and contained about 5 percent by weight boron. The resulting coated plate had a luminous transmission of about 30 percent. The film was very adherent to the glass plate and was very uniform in appearance.

EXAMPLE 2

A cobaltous chloride solution was utilized to form a transparent cobalt and boron containing film following the procedure set forth in Example 1, except that the cobalt solution and reducing solution were formulated as follows:

Cobalt solution

| | |
|---|---|
| Cobaltous chloride | 12 grams. |
| Boric acid | 3 grams. |
| Sodium gluconate | 9 grams. |
| Hydrazine sulfate | 0.5 gram. |
| Water | Added to 1 liter. |
| Ammonium hydroxide | Added to pH 7.6. |
| Ethomeen C–20 [1] | 0.06 gram. |

[1] Ethomeen C–20 (trademark of Armour and Company) is a cocoamine having an average molecular weight of 645 and the following generalized formula:

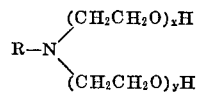

wherein R is derived from a cocoamine and $x+y$ equals 10.

Reducing solution

| | |
|---|---|
| Potassium borohydride | 0.75 gram. |
| Water | Added to 1 liter. |
| Sodium hydroxide | Added to pH 11.3. |
| Ethomeen C–20 | 0.03 gram. |

The resulting cobalt film comprised about 4 percent by weight boron, was very adherent, and was substantially free from visible defects. The resulting plate has a luminous transmission of about 33 percent.

EXAMPLE 3

A mixed cobalt acetate and nickel propionate solution was utilized to form a transparent cobalt, nickel and boron containing film. The process conditions were similar to those employed in Example 1, except that the nickel solution was replaced with a cobalt-nickel solution having the following composition:

Metal solution

| | |
|---|---|
| Cobaltous acetate | 4 grams. |
| Nickelous propionate | 10 grams. |
| Boric acid | 2.5 grams. |
| Sodium gluconate | 7 grams. |
| Hydrazine sulfate | 0.7 gram. |
| Water | Added to 1 liter. |
| Ammonium hydroxide | Added to pH 7.2. |
| Ethomeen C–15 | 0.06 gram. |

A transparent film was obtained that was very uniform and adherent. The light transmission of the resulting plate was about 34 percent.

EXAMPLE 4

A cobalt film was formed electrolessly from the following solutions:

Cobalt solution composition

| | |
|---|---|
| Cobaltous acetate | 5 grams. |
| Boric acid | 2.5 grams. |
| Sodium gluconate | 9.0 grams. |
| Water | Added to form 1 liter. |
| Ammonium hydroxide | Added to pH 7.4. |
| Surfactant Ethomeen (C–20) | 2 drops. |

Reducer solution composition

| | |
|---|---|
| Sodium borohydride | 0.5 gram. |
| Water | Added to form 1 liter. |
| Sodium hydroxide | Added to pH 11.2. |
| Ethomeen (C-20) | 1 drop. |

The above solutions were sprayed in equal volumes onto a glass plate which had been cleaned and sensitized in the manner described in Example 1. After spraying each solution at a constant rate of 75 to 120 milliliters per minute for about 1 minute and 20 seconds, a transparent adherent cobalt film was formed on the glass. The resulting plate had a luminous transmittance of about 20 percent.

EXAMPLE 5

An iron film was formed electrolessly from the following solutions:

Iron solution composition

| | |
|---|---|
| Ferrous ammonium sulfate | 5.0 grams. |
| Boric acid | 9.0 grams. |
| Water | Added to form 1 liter. |
| Ammonium hydroxide | Added to pH 7.3. |
| Surfactant Ethomeen (C-20) | 2 drops. |

Reducing solution composition

| | |
|---|---|
| Sodium borohydride | 0.50 gram. |
| Water | Added to form 1 liter. |
| Sodium hydroxide | Added to pH 11.4 |
| Ethomeen (C-20) | 1 drop. |

The above solutions were sprayed onto pre-sensitized glass in the manner described in Example 4. A transparent iron film having a light transmission of about 20 percent to 25 percent was formed after spraying for about 1 minute to 1½ minutes. The film must be rinsed immediately with demineralized water to preevnt oxidation. Of course, oxidation could be prevented by using methanol, ethanol, or similar polar organic solvents to form the metal salt and reducer solutions.

Although specific embodiments of the instant invention have been set forth hereinabove, the invention is not intended to be limited thereto but includes all of the modifications and variations falling within the scope of the following claims.

What is claimed is:

1. In an aqueous alkaline chemical filming composition for the deposition of metal films on substrates comprising a mixture of (1) an aqueous metal containing solution and (2) an aqueous reducing solution capable of reducing the contemplated metal, wherein
said metal solution comprises a metal ion selected from the group of nickel, cobalt, iron and mixtures thereof, and
said reducing solution comprises an alkali metal borohydride in an effective amount to reduce the contemplated metal and sufficient alkaline material to provide said mixture with an initial pH between about 7 and 8.5, the improvement comprising the inclusion in said metal solution of a nitrogen-hydrogen compound selected from the group consisting of hydrazine, hydrazine salts, hydroxylamines, phenylhydrazine and mixtures thereof in an effective amount to retard the deposition of metal by reduction and to thereby provide uniformity in a film deposited from said composition.

2. The filming composition of claim 1, wherein the selected metal ion is nickel.

3. The filming composition of claim 1, wherein the nitrogen-hydrogen compound is hydrazine sulfate.

4. The filming composition of claim 1, wherein said metal solution comprises nickel ion, boric acid, a chelating agent selected from the group consisting of gluconic acid and alkali metal gluconates, hydrazine sulfate and sufficient alkaline material to provide a pH of 7.0 to 7.6.

5. The filming composition of claim 4, wherein said nickel ion is provided by nickel acetate.

6. In an aqueous alkaline filming composition comprising an alkali metal borohydride and an aqueous solution of nickel ion wherein the borohydride and nickel are present in such proportions as to provide for the effective reduction of nickel by the borohydride to deposit a metal film on a substrate the improvement comprising the inclusion in said composition of a nitrogen-hydrogen compound selected from the group consisting of hydrazine, hydrazine salts, hydroxylamines, phenylhydrazine and mixtures thereof in an effective amount to retard the reduction and deposition of nickel and thereby provide for improved uniformity of the metal film deposited.

7. The filming composition of claim 6, wherein said nickel salt is nickel acetate and the nitrogen-hydrogen compound is hydrazine sulfate.

8. The filming composition of claim 6, wherein the combined composition of alkali metal borhohydride and aqueous solution has a pH of 7 to 8.5.

9. The filming composition of claim 1, wherein said metal solution comprises: (a) 0.5 to 50 grams per liter of an ionizable nickel salt, (b) 0.5 to 35 grams per liter of boric acid, (c) 1.0 to 75 grams per liter of a chelating agent selected from the group consisting of gluconic acid and alkali metal gluconates, (d) 0.1 to 5 grams per liter of a nitrogen-hydrogen compound selected from the group consisting of hydrazine, hydrazine salts, hydroxylamines, phenylhydrazine and mixtures thereof, and (e) sufficient alkali material to maintain the pH thereof between 7 and 7.6.

10. The filming composition of claim 9, further including a non-ionic wetting agent comprising a cocoamine-ethylene oxide condensation product.

References Cited
UNITED STATES PATENTS

| | | | |
|---|---|---|---|
| 3,096,182 | 7/1963 | Berzins | 106—1 |
| 3,121,644 | 2/1964 | Gutzeit et al. | 106—1 X |
| 3,198,659 | 8/1965 | Levy | 106—1 X |
| 3,403,035 | 9/1968 | Schneble et al. | 106—1 |
| 3,493,428 | 2/1970 | Hedberg et al. | 117—160 X |

LORENZO B. HAYES, Primary Examiner

U.S. Cl. X.R.

117—35 S, 47 R, 124 C, 130 E, 130 B, 160 R